United States Patent [19]

Palmer

[11] 4,286,145

[45] Aug. 25, 1981

[54] FIBER OPTIC BAR CODE READER

[75] Inventor: John P. Palmer, Pomona, Calif.

[73] Assignee: General Dynamics, Pomona Division, Pomona, Calif.

[21] Appl. No.: 123,039

[22] Filed: Feb. 20, 1980

[51] Int. Cl.³ .......................... G06K 7/10; G06K 7/14
[52] U.S. Cl. .................................. 235/454; 235/462; 235/473
[58] Field of Search ....................... 235/454, 462, 473; 350/96.26

[56] References Cited

U.S. PATENT DOCUMENTS

| | | | |
|---|---|---|---|
| 3,576,430 | 4/1971 | Fickenscher | 235/473 |
| 3,584,789 | 6/1971 | Kessler | 235/473 |
| 3,610,891 | 10/1971 | Raciazek | 235/473 |
| 3,671,722 | 6/1972 | Christie | 235/473 |
| 3,763,352 | 10/1973 | Del Rio | 235/473 |
| 3,766,364 | 10/1973 | Krecioch | 235/454 |
| 3,814,933 | 6/1974 | Weber | 250/227 |
| 3,937,558 | 10/1976 | Mukai | 350/96 B |
| 3,987,278 | 10/1976 | Van Elzakker | 235/454 |

Primary Examiner—Harold I. Pitts
Attorney, Agent, or Firm—Henry M. Bissell; Edward B. Johnson

[57] ABSTRACT

A fiber optic bar code reader utilizing a light source coupled to one port of a three-port directional coupler. A light detector is coupled to a second port of the coupler, a single fiber probe for receiving and transmitting light is coupled to the third port of the coupler. The coupler joins the three fibers so that light is initially transmitted from the light source to the probe fiber, exits the probe fiber, is selectively reflected by the bar code, and finally is transmitted through the directional coupler to the light detector.

23 Claims, 3 Drawing Figures

FIBER OPTIC BAR CODE READER

BACKGROUND OF THE INVENTION

1. Field of the Invention

The present invention relates to fiber optic information retrieval systems, and more particularly to bar code readers in which light is transmitted through a fiber optic system to a bar code on a package or other piece of retail merchandise or a bar code or other modulated reflective surface as, for example, on a memory tape or disc, and selectively reflected by the bar code back through the system for transmission to a light detector and circuitry to "read" the information contained in the bar code.

2. Description of the Prior Art

A large body of art is developing with regard to the use of fiber optics in bar code reader systems. Bar codes are commonly used to identify inventory items in warehouses and commercial stores. They also may be used in low cost, high memory density paper tape and other storage media. They consist of a number of spaced apart parallel lines of varying widths. Usually dark lines on a light reflecting background are used but reflective lines on a dark background also can be used. Data is coded in the width and spacing of the lines so that when an optical probe is scanned across the code in a direction normal to the lines a light beam in the probe is modulated in a manner which is unique to the particular code. The scanning can be effected either manually or automatically.

The modulated light beam is directed to and detected by an electro-optical detector such as a photodiode or phototransistor. From there the resulting signal is processed and strored in an electronic computer. When used in commercial stores, the computer is programmed to provide the price of the item being read to a cash register terminal and the item is also tallied with the other items read by the bar code reader. Optionally, the price can be manually inserted at the cash register terminal so that the system is not limited to bar code reading.

Generally, optical probes which are used to scan bar codes contain at least two essential components. These are an illuminator and an optical receiver. The illuminator is usually a small incandescent lamp or a light emitting diode (LED) coupled to a lens. The illuminator lens directs the light beam to the surface of the bar code where it is reflected back and collected by the optical receiver. The optical receiver utilizes a second lens to focus the light beam on an electro-optical detector. The light source and light detector may be located adjacent the respective lenses or they may be located remotely and connected to the lenses through optical fibers. The optical fibers are the type often utilized in fiber optic technology and may be made of glass or plastic material. The advantage of using optical fibers is that no electronic components are required inside the probe and thus no electrical connections are required inside the probe. As a result the probe can be smaller and less costly. However, the size, cost and resolving capability of the probes are limited by the need for separate distinct illuminator and receiver channels.

In the prior art, various arrays or systems utilizing plural optical fibers to transmit and receive light have been suggested. For example, Kessler et al in U.S. Pat. No. 3,584,779 and Christie in U.S. Pat. No. 3,671,722 both use two bundles of optical fibers. A color coding system is involved in both of these units, and the light is transmitted through a first bundle from its point of generation to its point of departure from the wand. A portion of the light is reflected back to the wand and is picked up by the fibers in the second bundle. The light is then transmitted through that bundle back to the sensing system. The same type of system is also disclosed in U.S. Pat. Nos. 3,987,278 of Van Elzakker et al, 4,052,594 of Davis, and 4,158,310 of Ho.

Specific shaped arrays of optical fibers have also been suggested. For example Mukai in U.S. Pat. No. 3,937,558 describes several different fiber arrays for the terminal or wand. In one array a large receiving optical fiber is surrounded by a series of small transmitting fibers. A second array has plural rows of individual fibers in which the transmitting and receiving functions are performed by alternate rows of fibers. Mukai also discloses the combination of a plurality of larger receiving fibers surrounded by numerous small transmitting fibers. Weber, on the other hand, in U.S. Pat. No. 3,814,939 discloses a wand having a rectilinear array of rectangular cross-section fibers. The array is manufactured in such a manner that transmisson and reception are effected by alternating fibers.

It has also been suggested that three separate bundles of fibers, each containing plural individual fibers can be utilized. In U.S. Pat. No. 3,766,364 of Krecioch three bundles are utilized. Each bundle contains plural fibers with two of the bundles being utilized for transmission and the third used for reception. Additionally, Pat. No. 3,610,891 of Raciazek discloses individual distinct single fiber transmission and reception lines. Raciazek uses two continuous sensor fibers combined with a single light source fiber positioned between the sensor fibers.

A significantly different system is disclosed by Hartelius in Pat. No. 4,059,338. In this system the light, generated by a laser, is transmitted to a prism which then transmits the light to a flat wide wave guide. The wave guide, which is usually tantalum pentoxide, transmits the light to a unit having pits or indentations. The light striking the pits is reflected and transmitted back through the same wave guide.

All of these units, with the exception of Hartelius, utilize discrete fibers for the transmission and reception functions. This requires careful alignment, and presents problems with regard to the location of the fibers at the end of the wand. Thus it would be a significant improvement in the art to produce a bar code reader which utilizes only a single fiber at the wand. In addition, the above systems generally require the use of lenses to focus the light from the plurality of fibers, or to produce a higher intensity signal for efficient reading of the bar code. Thus elimination of the need for such lenses would be a further improvement.

A simple bar code reader, claimed to be the world's first digital bar code wand, has been announced by Hewlett Packard in "Electronic Design" for Feb. 1, 1980. This wand is said to be capable of scanning black-and-white bar codes and converting the codes to microprocessor-recognizable digital output as a substitute for using a keyboard or push buttons for data entry with an increase in speed of from two to four times by virtue of using bar code scanning. This unit uses a light emitting diode, a photodiode detector, and lenses with appropriate electronic circuitry in the wand. However, it does not use optical fibers and it presents certain problems in attempting to read the finer line bars of standard bar codes.

SUMMARY OF THE INVENTION

The present invention consists primarily of three single optical fibers each connected to one of three ports of an optical fiber directional coupler. One fiber, the input fiber, transmits light from a light source to the directional coupler. In the directional coupler light received from the input fiber is coupled into a second fiber, the probe fiber, with only a small fraction, i.e. less than about 5%, of the light being coupled directly into the third (sensor) fiber. The light coupled to the probe fiber from the input fiber is transmitted to the free end of the probe fiber where it exits in a narrow cone shape. If, for example, this emitted light beam continues in free space or is absorbed in an absorbing medium such as black ink on a printed surface then no light is returned to the receiver. However, if a reflecting surface, such as a light surface, is positioned in front of the free end of the probe, then the light is reflected back into the probe fiber. This reflected light is then transmitted back to the directional coupler where it is coupled into the reception fiber, usually with greater than 95% coupling efficiency.

The couplers utilized in this invention are described in detail as to their manufacture and structure in applicant's copending application entitled OPTICAL FIBER LAUNCH COUPLER, Ser. No. 123,034 filed Feb. 20, 1980, assigned to the same assignee as the present application.

When the probe tip is scanned across a striped surface, such as a bar code, the reflected light signal is modulated due to the reflection/absorption characteristics of the bar code. The modulated light is received by a photodetector at the end of the sensor fiber where it is converted to an on-and-off modulated electrical signal, for example, for use in an electronic computer.

As a result, the present invention provides a means for optical sensing of bar codes and for converting the optical signal into an electronic signal at levels appropriate for digital hardware. The present invention may also be used for sensing modulated information recorded on reflective surfaces in other than bar code form, for example analog modulated information recorded as different shades between black and white. The optical probe requires only a single optical fiber and a remote directional coupler. Conventional optical connectors may be used to connect the probe fiber, the light source, and the light detector to the coupler, as required. The system does not require lenses, and electronic hardware is not required in the probe. Consequently, probe construction is simple and it may be used in environments which would be destructive to electronic hardware or which would interfere with transmission of electrical signals, such as under water or in intense electromagnetic fields. In addition, the probe is at least somewhat immune to electric shock hazards and is capable of high resolution with bar code elements as small as 10 mils. Thus, the probe has superior performance and low manufacturing cost, when compared to prior designs.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figure 1:
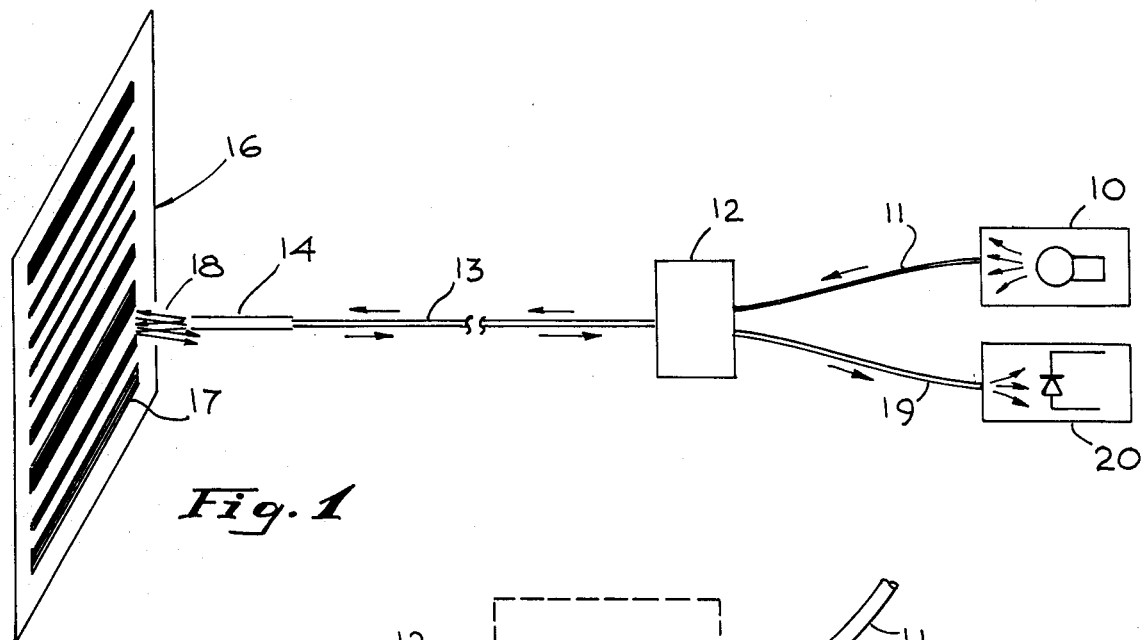
FIG. 1 is a schematic of the bar code reader of the present invention.

In FIG. 1, three-port fiber optic directional coupler 12 is provided light, generated by incandescent lamp light source 10, through input fiber 11. The light source also may be a light emitting diode (LED) or other light source. The connection between light source 10, and input fiber 11 can be effected by positioning the end of fiber 11 adjacent the light source, and by use of, for example, a collimating lens, not shown, as is well known in the art. The light transmitted through input fiber 11 is coupled, at coupler 12, to probe fiber 13. It is transmitted from the coupler to probe element 14, exits the end of probe element 14 and is directed to a bar code shown generally as 16. In this example, bar code 16 has a white or reflective background and is imprinted with a code 17 which is normally black but may be another light absorbing surface. The probe is manually scanned across bar code 16 such that the light emitted from the end of the probe is reflected when the probe passes over the reflective surface of the bar code, and not reflected when it is passed over the light absorptive surfaces. The reflected light is shown as arrows 18 in FIG. 1. Part of reflected light 18 reenters probe 14, is transmitted through fiber 13, and reenters coupler 12. In coupler 12, the light is coupled to sensor fiber 19, with only a small amount being transmitted to input fiber 11. The light in sensor fiber 19 is then transmitted to light detector 20, which may be a photocell. The character of the electrical pulse produced by the cell is controlled by the reflected light and not the absorbed light. It is amplified and then transmitted to, for example, a computer for determination of the nature the signal transmitted. When used in a store, the signal will indicate that a particular product has been purchased. The computer is programmed to send a signal to a cash register so that when the product's code is sensed by the computer the register is instructed to display a particular price.

The particular light source and bar code utilized can vary. For instance, an ordinary incandescent lamp can be used in combination with black bar code printing on a white or reflective background. In the alternative, light with a narrow wave length band could be utilized and the bar code printed so as to absorb the light. In this case, the background would be appropriately reflective.

The present system allows for the use of a single optical fiber probe line. The fiber has a protective coating and a wand is used for holding and directing the end of the optical fiber. The end of the fiber can be covered with a clear reflective surface, if desired, so long as the surface has the appropriate reflective index. However, there is no need for the lenses that are normally required for fiber bundle type, bar code readers since both the transmission and reception functions are combined into a single fiber in the apparatus of the present invention. Thus the unit is simpler and there is less danger of damage or erroneous readings. Also, any damage to the unit will affect both sending and receiving functions and thus the damage will be readily apparent so that the unit may be replaced.

Figure 2:
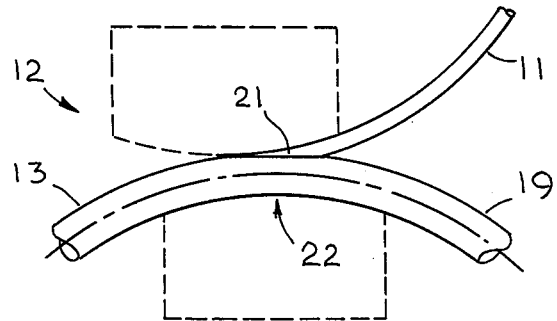
FIG. 2 is a schematic of the directional coupler utilized in the bar code reader herein.

The single fiber unit shown in FIG. 1 is made possible by the use of the directional optical fiber coupler which is shown schematically in FIG. 2. The manufacture of this optical fiber coupler is described in much greater detail in applicant's concurrently filed application Ser. No. 123,034, filed Feb. 20, 1980, entitled FIBER OPTIC LAUNCH COUPLER. In this unit, the light from input fiber 11 is coupled at surface 21 with throughput fiber 22. Due to the structure of the coupler, i.e. the joining of two flat elliptical surfaces of approximately equal size, about 95% of the light in input fiber 11 is transmitted to throughput fiber 22 and out of the coupler along probe fiber 13. The diameter of input fiber 11 is significantly smaller than that of throughput fiber 22 so that the core of input fiber 11, as described in applicant's copending application, is severed by lapping at an angle to the axis of the fiber so as to produce an elliptical surface. Throughput fiber 22 on the other hand, is lapped to produce an elliptical area of approximately equal size but since its diameter is greater than that of input fiber 11 only a small amount of the fiber is lapped away in producing the surface for contact between the two fibers. The fibers are bonded with an optically clear cement such as an epoxy resin to permanently position them.

In operation, when light is transmitted into the coupler along probe fiber 13 only a very small signal loss occurs at the contact surface. This is due to the fact that only a small portion of the surface of fiber 22 has been lapped away. Thus up to about 95% of the light transmitted towards the coupler through probe fiber 13 is transmitted out of the coupler through sensor fiber 19. As a result, when the system is activated and the probe tip is scanned across the striped surface of the bar coded item, the constant light supply generated by input fiber 11 is converted into an on and off blinking signal in reception fiber 19. The photodetector at the other end of fiber 19 then converts the blinking light to an on and off modulated electrical signal for the computer.

Figure 3:
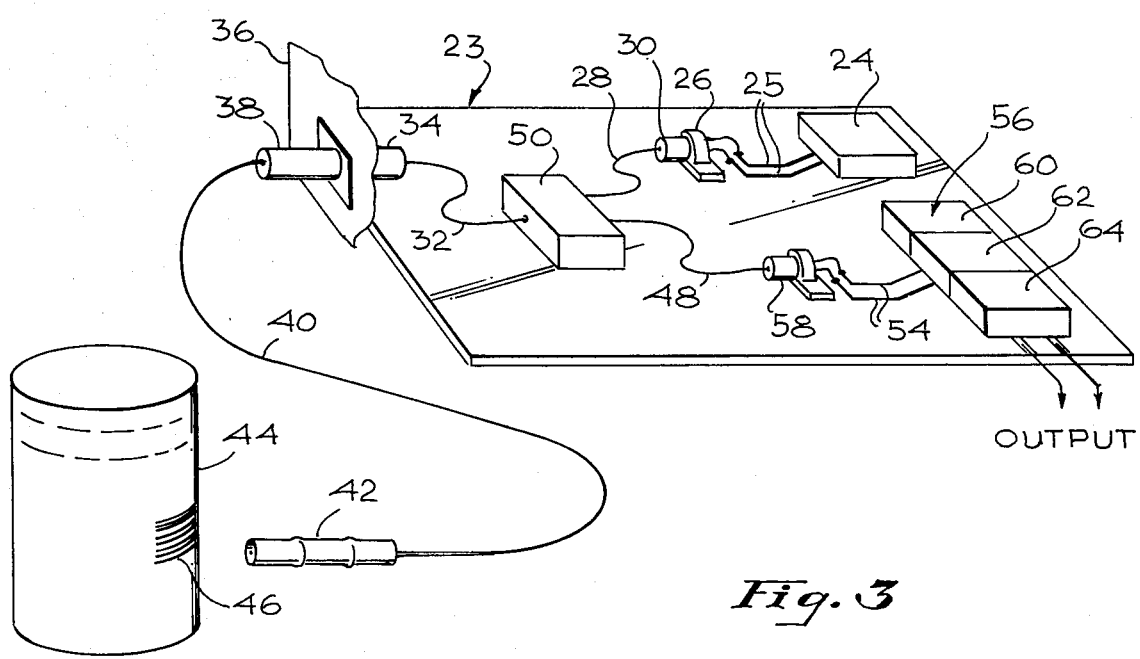
FIG. 3 is a schematic of an exemplary apparatus embodying the present invention.

In FIG. 3, a more detailed schematic of the apparatus of the present invention is provided. In the figure, printed circuit board 23, may be part of the computer structure for the present invention or may be any convenient base material. Light source driver/amplifier 24 is connected through wires 25 to an incandescent lamp contained in holder 26. In the alternative, the incandescent lamp may be a light emitting diode, or the connection may be made by a mating termination using an LED "pigtail" as described in literature relating to fiber optic applications. An exemplary light emitting diode is the RCA type C-30133 LED. When an LED is utilized, driver/amplifier 24 contains driver circuits. When the driver circuit produces direct current illumination, the sensed signal includes a dc component due to reflections from the coupler, and it includes a time-varying component which results from scanning the bar code. The dc background component is filtered out at the receiver by capacitively coupling between successive amplifier stages.

This mode of operation requires less electronic circuitry, but the lifetime of the light source and signal intensity can be increased substantially by modulating the light emitted by the LED. For example, the light intensity and source lifetime can be increased by a factor of about 10 by utilizing a 1% duty cycle at an arbitrary frequency between about 100 hz. and 1 MHz. This, however, requires a pulse generator to drive the LED. An exemplary pulse generator could include a timer chip as its active element. The LED would then be driven directly by totem-pole output from the chip at currents of up to about 200 mA. If higher current level chips are utilized they would require buffer transistors in the driver circuit. When a modulated light source is used, it is preferred that the frequency be sufficiently high to allow the use of a low frequency band pass filter in the sensor circuit. The filter would be such that the operator of the reader could not move the probe past the code at a rate that would produce a signal having a frequency exceeding the filter range. In addition, the light source frequency should be great enough to be easily discriminated from the probe signal.

The increased optical signal level associated with this type of pulse source permits detection of signals received through an optical path having greater attenuation or from a bar code with reduced reflection differentials. Another signficant advantage of the pulse source is that the decoding circuitry is less complex. Each element of the bar code, i.e. the light absorbing lines, results in a number of "missing" pulses at the receiver (in the absence of a low pass filter). The first bar would produce a calibration frame against which the other frames, corresponding to other bars, would be compared. For example, the first bar may produce 10 missing pulses depending upon how rapidly the wand is moved across the bar code. If the next bar results in 30 missing pulses, then the bar is three times wider than the calibration bar, and this relationship between the calibration frame and the first frame is used by the computer to determine the readout.

The light produced by the LED is transmitted to input line 28 through connector 30, which is, for example, a conventional "optical SMA" connector such as those manufactured by The Amphenol Division of the Bunker-Ramo Corporation. The input fiber itself, is generally of the clad single fiber type, and is preferably a glass-clad-glass fiber, such as the Galite fibers manufactured by Galileo Electro-Optics, Inc.

Input fiber 28 is connected to directional coupler 50, which is shown in more detail in FIG. 2. It should be noted, however, that input fiber 28 may be an extension of fiber 11 as shown in FIG. 2, or may be connected thereto, such as with the "optical SMA" fiber connectors noted above. Probe line 32 can be an extension of probe line 13 as shown in FIG. 2, or an independent line. In addition, probe line 32 is preferably attached to optical connector 34 positioned on one side of housing 36. Connector 34 is adapted to be removably connected to another connector 38 to make external probe line 40 removable from housing 36. External probe line 40 along with internal probe line 32 and receiver line 48 are preferably glass-clad glass monofilament fibers having a step index fiber core with a diameter equal to about 0.200 mm. An exemplary preferred fiber is the Galite 3000 LC fiber manufactured by Galileo Electro-Optics, Inc. External probe fiber is terminated at wand 42 with an SMA connector in the preferred form. However, only a bell housing for the termination would be required when wand 42 is a molded hand-held probe tip. The light produced by driver/amplifier 24 and transmitted through the above-described circuitry exits wand 42 and impinges upon can 44 having bar code 46. The scanning procedure noted above is then utilized and the resulting reflected signal is transmitted back through external probe fibers 40 and 32 into directional coupler 30. Because of the design of directional coupler 30 about 95% of the light reflected back to the coupler is transmitted to sensor fiber 48. Sensor fiber 48 is provided with another connector 58 and the signal therein is directed to a photodiode which converts the signal from a modulated optical signal to a modulated electric current at current levels typically on the order of a few microamperes. The current is transferred to a pre-amplifier 60 in unit 56 through lines 54. Pre-amplifier 60 converts the signal to a modulated potential at a level typically of around 10 millivolts. The modulated potential is then amplified by a second amplifier 62 contained in unit 56 to a level compatible with that required by an emitter-coupled logic (ECL) electronic computer. If transistor-transistor logic (TTL) potential levels are required a third amplifier/level shifter 64 can be connected to the output of the second amplifier to appropriately modify the signal. This type of sensor circuitry is capable of receiving optical signals through lines 54 as low as about 0.5 microwatts and converting them to signals useful at either ECL or TTL levels. The electronic signals can then be directed to the appropriate data processing and storage apparatus for use.

Although there have been described above specific arrangements of a fiber optic bar code reader in accordance with the invention for the purpose of illustrating the manner in which the invention may be used to advantage, it will be appreciated that the invention is not limited thereto. For example, although the invention is disclosed in the context of association with visible light, using particular light sources, other light sources may be utilized, and the principles of the invention are equally applicable thereto. Other forms of bar code recordings such as tapes and discs, and other modulated information, both analog and digital, recorded on reflective media may be read by apparatus in accordance with the present invention. Accordingly, any and all modifications, variations or equivalent arrangements which may occur to those skilled in the art should be considered within the scope of the invention as defined by the appended claims.

What is claimed is:

1. An optical information reader comprising:
    probe means effective to emit optical signals and receive reflected optical signals;
    a single optical fiber having two ends, coupled at one end to said probe means for bidirectional transmission of optical signals;
    optical coupler means having three ports, the first of said ports being coupled to the other end of said fiber;
    optical signal generating means coupled to the second port of said coupler means in order to provide signals for emission from said probe; and
    optical signal receiving means coupled to the third port of said coupler means in order to sense reflected signals received by said probe.

2. The reader of claim 1 wherein the first port and the third port constitute two spaced-apart points on a single optical fiber.

3. The reader of claim 2 wherein the second port of said coupler means constitutes a single optical fiber joined to the fiber of the first and third ports.

4. The reader of claim 3 wherein the fiber comprising the first and third ports and the fiber comprising the second port are circular in cross-section.

5. The reader of claim 4 wherein the diameter of the fiber comprising the first and third ports is greater than the diameter of the fiber comprising the second port.

6. The reader of claim 5 wherein the fibers are glass-clad-glass fibers having circular cross-section cores.

7. The reader of claim 5 wherein the fiber comprising the second port is terminated at a junction with the core of the fiber comprising the first and third ports.

8. The reader of claim 7 wherein the termination of the fiber comprising the second port is an elliptical planar surface.

9. The reader of claim 8 wherein the elliptical surface constitutes a cross-section of the fiber produced at an angle to its axis.

10. The reader of claim 9 wherein the elliptical surface on the fiber comprising the second port is mated with an elliptical surface on the fiber comprising the first and third ports.

11. The reader of claim 10 wherein the elliptical surface on the fiber comprising the first and third ports is produced by removing a small section of the fiber along the outer surface of an arc formed in the fiber.

12. The reader of claim 1 wherein the signal receiving means includes a photodiode.

13. The reader of claim 12 wherein said signal receiving means further comprises amplifying means effective to amplify the signal produced by the photodiode.

14. The reader of claim 13 further comprising means effective to convey the amplified signal to information processing equipment.

15. The reader of claim 1 wherein the signal generating means includes a light-emitting diode.

16. An optical information reader comprising:
    signal generating means;
    signal receiving means; and
    signal transmission means comprising single-optical-fiber means and a first single optical fiber operatively connected together;
    said fiber means having two ends, the first end thereof being operatively connected to said signal receiving means and the second end thereof being effective to transmit signals and receive modulated optical signals responsive to recorded information;
    said first fiber having two ends, one end being coupled to receive optical signals from said signal generating means, the other end being joined in substantially unidirectional light-transmitting relationship to said fiber means at a point between the ends of said fiber means;
    whereby optical signals generated by said generating means are coupled to said fiber means by said first fiber, transmitted to the second end of said fiber means, modulated by the recorded information and partially reflected back to said fiber means, and transmitted to said receiving means.

17. The reader of claim 16 wherein the signal generating means includes a light emitting diode driven by modulated signal generating means.

18. The reader of claim 16 further comprising means for amplifying signals received by said signal receiving means.

19. The reader of claim 18 further comprising means to convey amplified signals to a display.

20. The reader of claim 16 wherein said fiber means comprises a second single optical fiber.

21. The reader of claim 20 wherein said fibers are circular in cross-section and the diameter of the first fiber is smaller than the diameter of the second fiber.

22. The reader of claim 21 wherein the first fiber is coupled to the second fiber at an elliptical surface formed at the other end of the first fiber.

23. The reader of claim 22 wherein said second fiber contains a substantially planar elliptical surface along an arcuate portion thereof, which substantially planar elliptical surface is coupled to the elliptical surface of said first fiber.

* * * * *